United States Patent
Dievart et al.

(10) Patent No.: US 11,313,325 B2
(45) Date of Patent: Apr. 26, 2022

(54) GAS TURBINE ENGINE WITH MINIMAL TOLERANCE BETWEEN THE FAN AND THE FAN CASING

(71) Applicant: Safran Aircraft Engines, Paris (FR)

(72) Inventors: Jeremy Dievart, Moissy-Cramayel (FR); Yanis Benslama, Moissy-Cramayel (FR); Nathalie Nowakowski, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 99 days.

(21) Appl. No.: 16/085,441

(22) PCT Filed: Mar. 15, 2017

(86) PCT No.: PCT/FR2017/050597
§ 371 (c)(1),
(2) Date: Sep. 14, 2018

(87) PCT Pub. No.: WO2017/158295
PCT Pub. Date: Sep. 21, 2017

(65) Prior Publication Data
US 2019/0085790 A1    Mar. 21, 2019

(30) Foreign Application Priority Data

Mar. 15, 2016    (FR) ...................................... 1652162

(51) Int. Cl.
*F02K 3/04*    (2006.01)
*F02C 7/36*    (2006.01)
(Continued)

(52) U.S. Cl.
CPC ................ *F02K 3/04* (2013.01); *F01D 11/20* (2013.01); *F01D 21/04* (2013.01); *F01D 21/045* (2013.01);
(Continued)

(58) Field of Classification Search
CPC ... F02K 3/04; F02K 3/075; F02K 3/06; F02K 3/068; F02C 7/04; F02C 7/36;
(Continued)

(56) References Cited

U.S. PATENT DOCUMENTS

2010/0077721 A1*    4/2010    Marshall ............... F01D 21/045
                                            60/39.091
2012/0324907 A1*    12/2012    Waldron ................ B64D 29/06
                                            60/797
(Continued)

FOREIGN PATENT DOCUMENTS

| EP | 2 623 723 A2 | 8/2013 |
| FR | 2 968 364 A1 | 6/2012 |

(Continued)

OTHER PUBLICATIONS

Ryan, The Effect of Tip Clearance of the Performance of an Axial Flow Fan (1955), Gas Turbine Laboratory MIT, Report No. 31, pp. 1-33 (Year: 1955).*

(Continued)

*Primary Examiner* — Jason H Duger
(74) *Attorney, Agent, or Firm* — Oblon, McClelland, Maier & Neustadt, L.L.P.

(57) ABSTRACT

A turbofan having a dilution rate of at least 10 and including a fan having a disc provided with blades at the periphery thereof, a distance between the head of the blades and the housing of the fan being less than or equal to ten millimeters; a primary flow space and secondary flow space that are concentric; a turbine, housed in the primary flow space and in fluid communication with the fan; and a reduction mechanism coupling the turbine and the fan.

18 Claims, 4 Drawing Sheets

(51) Int. Cl.
F01D 21/04 (2006.01)
F01D 11/20 (2006.01)

(52) U.S. Cl.
CPC ............ F02C 7/36 (2013.01); *F05D 2220/36* (2013.01); *F05D 2240/14* (2013.01); *F05D 2240/307* (2013.01); *F05D 2260/311* (2013.01); *F05D 2260/40311* (2013.01); *F05D 2260/606* (2013.01); *F05D 2300/2102* (2013.01); *F05D 2300/224* (2013.01); *F05D 2300/2261* (2013.01); *F05D 2300/434* (2013.01); *F05D 2300/603* (2013.01); *Y02T 50/60* (2013.01)

(58) Field of Classification Search
CPC ........ F01D 11/20; F01D 21/045; F01D 21/04; F05D 2300/603; F05D 2300/434; F05D 2300/2102; F05D 2300/224; F05D 2300/2261; F05D 2220/36; F05D 2260/311; F05D 2240/14; F05D 2240/307; F05D 2260/40311; F05D 2260/606
See application file for complete search history.

(56) References Cited

U.S. PATENT DOCUMENTS

| 2013/0202418 | A1 | 8/2013 | Ditomasso et al. | |
|---|---|---|---|---|
| 2013/0202424 | A1* | 8/2013 | Lussier | F01D 5/08 415/200 |
| 2013/0202430 | A1* | 8/2013 | Gaudry | F02C 7/32 415/214.1 |
| 2016/0001873 | A1* | 1/2016 | Schwarz | F02C 7/36 416/245 R |
| 2016/0017746 | A1 | 1/2016 | Husband et al. | |
| 2016/0160875 | A1 | 6/2016 | Schwarz | |
| 2016/0363047 | A1* | 12/2016 | Schwarz | F01D 5/14 |

FOREIGN PATENT DOCUMENTS

| WO | WO 2014/163675 A1 | 10/2014 |
|---|---|---|
| WO | WO 2015/030946 A1 | 3/2015 |
| WO | WO 2015/050619 A2 | 4/2015 |

OTHER PUBLICATIONS

Moore et al., Effects of Tip Clearance on Overall Performance of Transonic Fan Stage With and Without Casing Treatment [1977], NASA, NASA TM X-3479, All (Year: 1977).*
French Preliminary Search Report dated Dec. 20, 2016 in Patent Application No. 1652162 (with English translation of categories of cited documents).
International Search Report dated Jun. 9, 2017 in PCT/FR2017/050597 (with English translation of categories of cited documents).
International Search Report dated Jun. 9, 2017 in PCT/FR2017/050597 filed Mar. 15, 2017.

* cited by examiner

GAS TURBINE ENGINE WITH MINIMAL TOLERANCE BETWEEN THE FAN AND THE FAN CASING

FIELD OF THE INVENTION

The invention relates to the field of turbomachines, and more particularly bypass gas turbine engine s having a high, or even very high, bypass ratio.

TECHNOLOGICAL BACKGROUND

Figure 4:
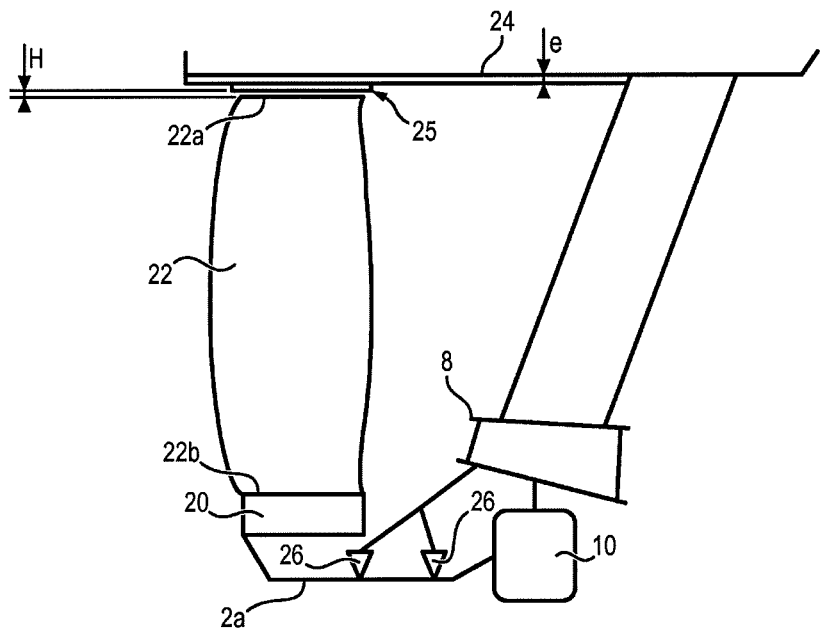
Figure 5:
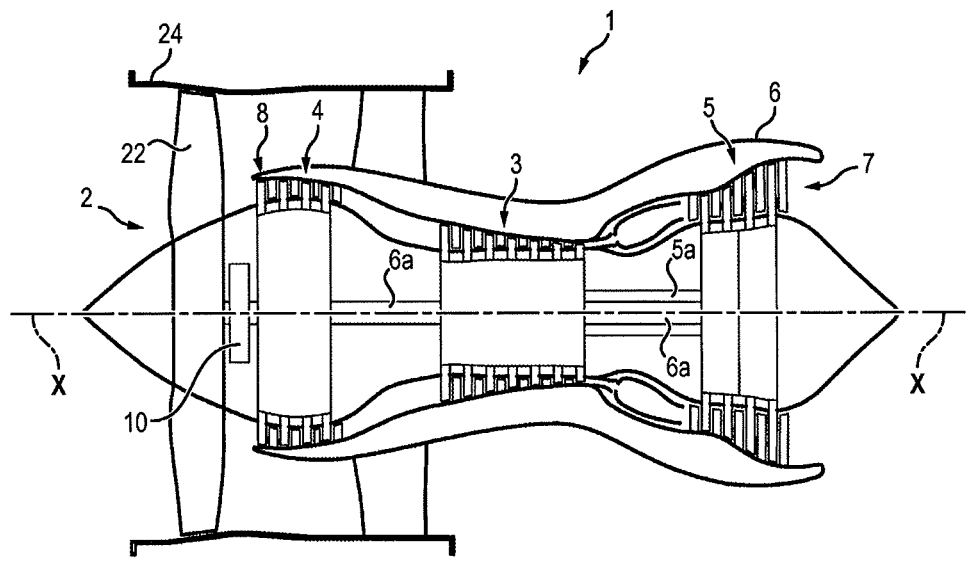

As shown in the attached FIGS. 4 and 5, a gas turbine engine 1 bypass generally comprises, from upstream to downstream in the direction of the flow of gases, a fan 2 housed in a fan casing 24. The fan 2 comprises a fan disc 20 (or rotor) provided with blades 22 at its periphery which, when set in rotation, cause airflow in the gas turbine engine 1. The air mass suctioned by the fan 2 is therefore divided into a primary flow, which circulates in the primary flow space, and a secondary flow, which is concentric with the primary flow and circulates in the secondary flow space.

The primary flow space passes through a primary body comprising one or more compressor stages, for example a low-pressure compressor 4 and a high-pressure compressor 3, a combustion chamber, one or more turbine stages, for example a high-pressure turbine 5 and a low-pressure turbine 6, and a gas discharge nozzle 7.

A bypass turbojet engine generally comprises, from upstream to downstream in the direction of the flow of gases, a ducted fan housed in a fan casing, a primary annular flow space and a secondary annular flow space. The air mass suctioned by the fan 2 is therefore divided into a primary flow, which circulates in the primary flow space, and a secondary flow, which is concentric with the primary flow and circulates in the secondary flow space Typically, the high-pressure turbine 5 drives the high-pressure compressor 3 in rotation by means of a first shaft, called high-pressure shaft 5a, whereas the low-pressure turbine 6 drives the low-pressure compressor 4 and the fan 2 in rotation by means of a second shaft, called low-pressure shaft 6a. The low-pressure shaft 6a is generally housed in the high-pressure shaft 5a, said shafts 5a, 6a being fixed to the structural parts (including the input casing which comprises a wheel of fixed blades which supports the fan casing) of the gas turbine engine 1 by means of bearings, typically downstream of the separating spout 8 configured to separate the primary flow and the secondary flow.

Figure 1:
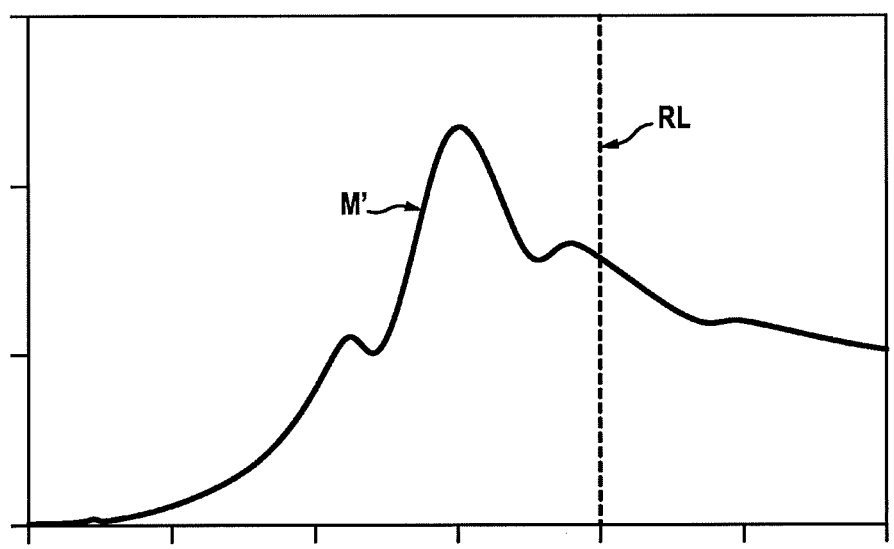

During breaking of a blade 22 of a fan 2 ("fan blade out" or FBO), for example under the impact of a foreign body, the fan 2 undergoes substantial unbalancing. Reference could be made to FIG. 1 especially which illustrates the response of the fan 2 to unbalancing resulting from loss of a blade 22 as a function of the speed of rotation (in revolutions per minute) of the low-pressure shaft 6a. Because flexural deformation mode M of the fan shaft 2 is located in the operating range of the gas turbine engine 1, there is a high risk of damage to the gas turbine engine.

It has therefore been proposed to place a decoupler 9 between the fan 2 and the input casing hub, typically in the region of the separating spout 8, to allow the fan 2 to function in degraded mode despite the presence of considerable unbalancing. For this reason, when the breaking load of the decoupler 9 is reached due to loss of a fan blade, one of the bearing links 26 is broken (generally the link of the front bearing 26 of the shaft 2a supporting the fan 2), which changes the dynamic situation of the fan 2 and has the flexural deformation mode of the fan shaft 2 drop to low frequencies. After this link breaks the rotor 20 of the fan 2 can recenter around its new axis of inertia, causing a reduction in forces transmitted to the structures. The distance H between the blades 22 of the fan 2 and the casing of the fan 2 must be sufficient (of the order of forty millimeters) between the tip 22a of the blades 22 of the fan 2 and the fan casing 24 to allow free orbiting of the rotor 20 and prevent the blades 22 of the fan 2 from coming into contact with the fan casing 24 (see FIG. 2a). It is therefore possible to make fan casings 2 of reduced mass, since the latter do not have to resist the contact forces with the blades in case of FBO. But such an increase of the diameter of the fan casing 24 involves an increase in the dimension of the nacelle, which has a negative impact on the drag of the gas turbine engine 1, on its mass and on its specific consumption.

There are also engines with no decoupler 9 in which the fan turns freely during loss of a blade and is driven only by the flow of the airflow (autorotation phenomenon, or windmilling). In this type of engine, in case of FBO, the tip 22a of the blades of the fan 2 comes to rest against the part opposite the casing of the fan 2 (due to unbalancing). The contact zone is however arranged to support contact forces and friction (see FIG. 2b), to the extent where the engine transmits more force to the structure of the aircraft. In this way, the fan can turn freely in degraded mode until the aircraft lands. To guarantee resistance to contact forces with the blades 22 of the fan 2 by the fan casing 24 in degraded mode, the external surface of the fan casing 24 is reinforced structurally by means of reinforcements 28 which generally comprise a metallic annular flange connected and fixed to its external face. But such a reinforcement 28 consequently increases the mass of the fan casing 24 and therefore of the gas turbine engine 1, also boosting the specific consumption of the gas turbine engine 1.

Consequently, none of the proposed solutions provides a gas turbine engine 1 of reduced mass whereof the fan can turn freely in degraded mode in case of breaking a fan blade 22 (FBO).

SUMMARY OF THE INVENTION

An aim of the invention is to propose a bypass gas turbine engine which has reduced mass in comparison with conventional bypass gas turbine engine s and is capable of turning in degraded mode in case of breaking a fan blade.

For this, the invention proposes a bypass gas turbine engine comprising:

a fan housed in a fan casing, said fan comprising a disc provided with fan blades at its periphery, each fan blade comprising a blade tip extending at a distance from the disc, a primary flow space and a secondary concentric flow space, a turbine, housed in the primary flow space and in fluid communication with the fan, and a reduction mechanism, coupling the turbine and the fan.

The gas turbine engine has a bypass ratio greater than or equal to 10. Also, a distance between the tip of the fan blades and the fan casing is less than or equal to ten millimeters.

Here, the distance between the tip of the fan blades and the fan casing is measured cold, when the gas turbine engine is idle.

Some preferred though non-limiting characteristics of the gas turbine engine described above are the following, taken individually or in combination:

It has a bypass ratio between 12 and 18, the distance between the tip of the fan blades and the fan casing is less than or equal to six millimeters, preferably equal between five and six millimeters, a thickness of the fan casing is less than or equal to fifteen millimeters, preferably less than or equal to twelve millimeters, for example less than or equal to ten millimeters, an external diameter of the fan is between eighty inches (203.2 centimeters) and one hundred inches (254.0 centimeters), preferably between eighty inches (203.2 centimeters) and ninety inches (228.6 centimeters). Optionally, the diameter of the fan is between eighty inches (203.2 centimeters) and ninety inches (228.6 centimeters) and a thickness of the fan casing is between nine millimeters and twelve millimeters, for example equal to ten millimeters, a difference in thickness of the fan casing, between an upstream end and a downstream end of said fan casing, is less than or equal to ten millimeters, the fan casing is made of a composite material comprising a fibrous reinforcement densified by a matrix, said fibrous reinforcement comprising fibres selected in the following group: carbon, glass, aramid, silica carbide and/or ceramic, and/or said matrix comprising a polymer selected in the following group: epoxide, bismaleimide and/or polyimide, the fan casing has a thickness between eight and twenty millimeters, preferably between ten and eighteen millimeters, for example between twelve millimeters and fifteen millimeters, the reduction mechanism is star gear or planetary and has a reduction ratio between 2.5 and 5, and/or the gas turbine engine also comprises a separating spout extending downstream of the fan and configured to separate the primary flow space and the secondary flow space, said gas turbine engine being devoid of decoupler between the fan and said separating spout.

BRIEF DESCRIPTION OF DIAGRAMS

Figure 2A:
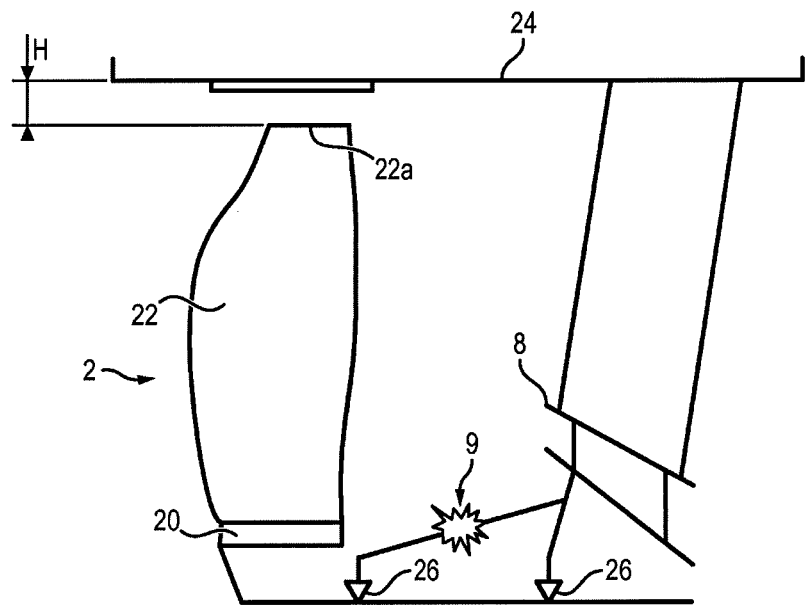
Figure 2B:
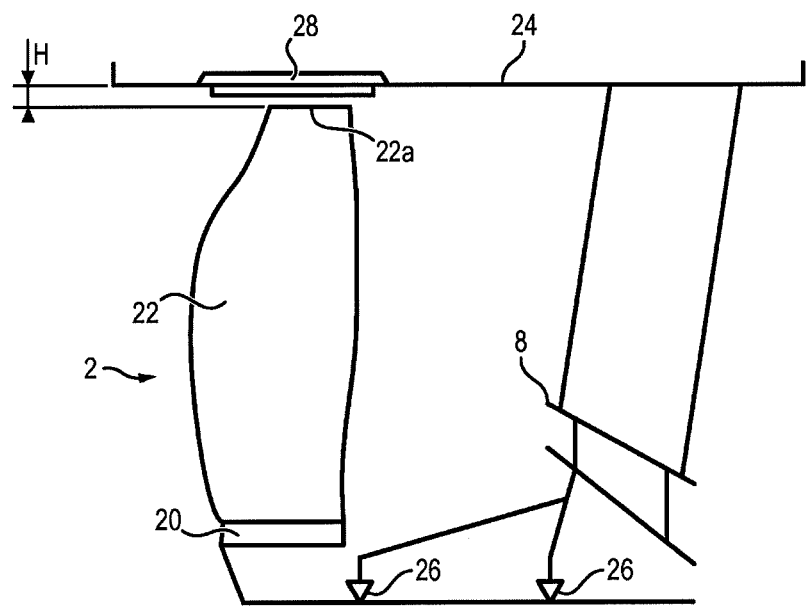
Figure 3:
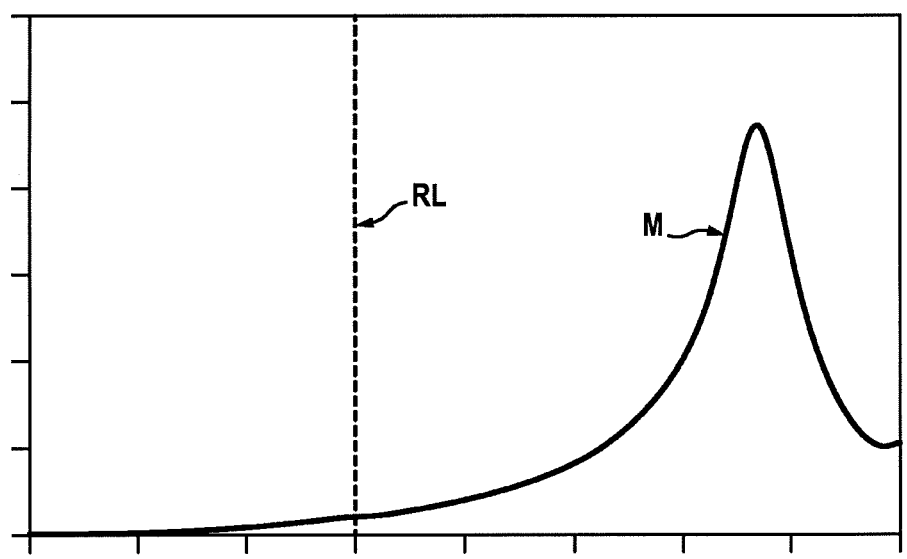

Other characteristics, aims and advantages of the present invention will emerge more clearly from the following detailed description and with respect to the appended drawings given by way of non-limiting examples, in which:

FIG. 1 illustrates the load (in Newton N) applied by the disc of the fan of a gas turbine engine according to the prior art on the front bearing of the fan 2 prior to breaking of the decoupler as a function of the speed of the low-pressure shaft 6a (in revolutions per minute (rpm)), FIG. 2a is a partial schematic view of the front of a first example of a gas turbine engine according to the prior art, showing especially a fan, a decoupler and structural parts of the gas turbine engine, FIG. 2b is a partial schematic view of the front of a second example of a gas turbine engine according to the prior art, the gas turbine engine being devoid of decoupler, FIG. 3 illustrates the load (in Newton N) applied by the disc of the fan of a gas turbine engine according to an embodiment of the invention on the front bearing of the fan as a function of the speed of the low-pressure shaft (in revolutions per minute (rpm)), FIG. 4 is a partial schematic view of the front of an embodiment of a gas turbine engine according to the invention, showing especially a fan and structural parts of the gas turbine engine, and FIG. 5 is a partial sectional view of an embodiment of a gas turbine engine according to the invention.

DETAILED DESCRIPTION OF AN EMBODIMENT

A gas turbine engine 1 will now be described below in reference to the attached FIGS. 3 to 5.

The gas turbine engine 1 conventionally comprises a fan 2 housed in a fan casing 24, a primary annular flow space and a secondary annular flow space.

The primary flow space travels through a primary body. As the primary body has been described earlier, it will not be detailed further here.

The fan 2 comprises a fan disc 20 provided with fan blades 22 at its periphery which, when set in rotation, drive the airflow in the spaces of primary and secondary flow of the gas turbine engine 1. The fan disc 20 is driven by the low-pressure shaft 6a which is centred on the axis X of the gas turbine engine 1 by a series of bearings and is driven in rotation by the low-pressure turbine 6.

The fan casing 24 has an overall annular form and has an internal face, extending opposite the blades 22 of the fan 2, and an external face opposite the internal face and extending opposite the nacelle. An abradable material 25 can be fixed to the internal face of the fan casing 24 opposite the fan blades 22.

To improve the propulsive output of the gas turbine engine 1 and reduce its specific consumption as well as any noise emitted by the fan 2, the gas turbine engine 1 has a bypass ratio ("bypass ratio"), which corresponds to the ratio between the rate of the secondary flow (cold) and the rate of the primary flow (hot, which passes through the primary body) high. High bypass ratio here means a bypass ratio of over 10, for example between 12 and 18.

For this reason, the fan 2 is disconnected from the low-pressure turbine 6, accordingly optimizing their respective speed of rotation independently. For example, the disconnecting can be done by means of a reducer such as a star gear reduction mechanism 10 or a planetary gear reduction mechanism, placed between the upstream end (relative to the flow direction of the gases in the gas turbine engine 1) of the low-pressure shaft 6a and the fan 2. The fan 2 is driven by the low-pressure shaft 6a by means of the reduction mechanism 10 and an additional shaft, called fan shaft 2a, which is fixed between the reduction mechanism 10 and the disc 20 of the fan 2.

This disconnecting reduces the speed of rotation and the pressure ratio of the fan 2 ("fan pressure ratio") and increases the power extracted by the low-pressure turbine 6.

To calculate the bypass ratio, the rate of the secondary flow and the rate of the primary flow are measured when the gas turbine engine 1 is stationary in a standard atmosphere (such as defined by the manual of the International Civil Aviation Organisation (ICAO), Doc 7488/3, $3^{rd}$ edition) and at sea level.

In an embodiment, the reduction mechanism 10 comprises a star gear reduction mechanism 10.

The reduction ratio of the reduction mechanism 10 is preferably between 2.5 and 5.

The diameter of the fan 2 can be between eighty inches (203.2 centimeters) and one hundred inches (254.0 centimeters), preferably between eighty inches (203.2 centimeters) and ninety inches (228.6 centimeters). Diameter of the fan 2 here means the radial distance between the axis X of revolution of the gas turbine engine 1 and the tip 22a of the fan blades 22.

The applicant noticed, because of the reduction mechanism 10 which reduces the speed of rotation of the fan 2 (of the order of 30% relative to the equivalent speed of rotation of the fan of a gas turbine engine devoid of reduction mechanism) and stiffens the disc 20 of the fan 2 (the shaft 2a being short and on two supports 26), that the distance H between the tip 22a of the fan blades 22 and the fan casing 24 is clearly reduced when a fan blade 22 breaks (FBO). As a consequence, it is possible to reduce the distance H between the tip 22a of the fan blades 22 and the fan casing 24 such that said distance H is at most equal to ten millimeters, or even less than six millimeters, for example of the order of five to six millimeters. It is evident that a distance H of five to six millimeters between the tip 22a of the fan blades 22 and the internal face of the fan casing 24 corresponds overall to the conventional thickness of the abradable material 25 which is fixed to the fan casing 24.

The distance H between the tip 22a of the fan blades 22 and the fan casing 24 is measured cold when the gas turbine engine 1 is idle. As an operation, this distance H can decrease by around 1 to 2 mm due to rotation of the fan blades 22 in a fixed casing 24 and different dilations between the different materials constituting the fan 2.

If appropriate, the variation in this distance H can be minimized by using identical materials which dilate slightly for the largest pieces. For this, the casing 24 and the blades 22 can be made for example from a composite material of organic matrix, the fan disc can be metallic (alloy of steel or titanium) and can have a minimal external radius and a low volume.

Due to this minimal distance H, the external diameter of the fan casing 24 is therefore less than in the event where a considerable distance is left to avoid any contact between the fan blades 22 and the fan casing 24, also limiting the dimensions of the nacelle containing the fan casing 24, and therefore the drag of the gas turbine engine 1.

For a gas turbine engine 1 of high bypass ratio, a distance H of the order of five to six millimeters ensures that the fan blades 22 do not come into contact with the fan casing 24 in case a blade 22 breaks (FBO). It is therefore no longer necessary for the fan casing 24 to play a role of retaining the blades 22 in case of breaking of a fan blade 22, which dispenses with the reinforcements usually fixed to the external face of the fan casing 24 (in particular the reinforcements 28 shown in FIG. 2b of the prior art). Therefore, the fan casing 24 can for example have a thickness e less than or equal to fifteen millimeters in the zone extending opposite the fan blades 22, preferably less than or equal to thirteen millimeters, typically under ten millimeters in the case of a fan casing 24 made of metallic material. Thickness e here means the dimension extending between a lower face of the fan casing 24 (to which an abradable material 25 can be fixed) and an external face (extending opposite the nacelle).

For example, for a fan diameter 2 between eighty inches (203.2 centimeters) and ninety inches (228.6 centimeters), the thickness e of the fan casing 24 is preferably between nine millimeters and twelve millimeters, typically equal to ten millimeters.

For a fan diameter 2 between ninety inches (228.6 centimeters) and one hundred inches (254.0 centimeters), the thickness e of the fan casing 24 is preferably between twelve millimeters and fifteen millimeters.

Also, the difference in thickness e between the external face and the internal face of the fan casing 24, along the fan casing 24 (that is, along the axis X of the gas turbine engine 1), can be at most ten millimeters. This is permitted especially by the absence of reinforcements 28 on the external face of the fan casing 24.

Since the fan casing 24 is no longer likely to resist the support forces of the fan blades 22 in case of FBO, it also becomes possible to make the fan casing 24 from a composite material of fibrous reinforcement type reinforced by a matrix. Such material considerably reduces the mass of the fan casing 24, and therefore the mass and the specific consumption of the gas turbine engine 1. The fibrous reinforcement comprises fibres configured to form the armature of the composite material and regain the essence of the mechanical forces. The fibres can especially be based on carbon, glass, aramid, silicon carbide and/or ceramic. The main aim of the matrix as such is to transmit the mechanical forces to the reinforcement, ensure the protection of the reinforcement relative to diverse environmental conditions and give the preferred form to the finished product. For example, the matrix can comprise a polymer, especially of epoxide, bismaleimide or polyimide type. In this case, the fan casing 24 can for example have a thickness e less than or equal to ten millimeters, when the fan 2 has an external diameter of around 210 centimeters.

The applicant also ascertained that, in a gas turbine engine 1 with high bypass ratio, the decoupler located between the bearings 28 and the separating spout 8 can be omitted without impairing the resumption of forces resulting from breaking of a fan blade 22 (FBO). In fact, due to the reduction mechanism 10 which reduces the speed of rotation of the fan 2 as an operation as well as the length of the shaft 2a which drives the fan 2 directly in rotation, the deformation modes M of the bearings 26 which support the shaft 2a of the fan are pushed back outside the operating ranges of the gas turbine engine 1. Particular reference could be made to FIG. 3 which illustrates the flexural deformation mode M of the fan 2 relative to the absolute maximal speed RL met by the fan shaft 2a throughout the flight ("redline"). In particular, as the deformation mode M in FBO is beyond the redline RL, it is outside the operating range of the gas turbine engine 1. The load of the disc 20 for a bladed fan transmitted by the fan shaft 2a to the bearings 26 of the fan 2 is consequently greatly reduced and accordingly makes breaking of one of the bearing links 26 of the fan 2 optional.

In the example illustrated in FIG. 3, the redline RL of the fan shaft 2a is between 2000 rpm and 4000 rpm, typically around 3000 rpm.

Omitting the decoupler contributes to reduction in mass of the gas turbine engine 1, and therefore improves the specific consumption of the gas turbine engine 1.

The invention claimed is:
1. A bypass gas turbine engine comprising:
a fan casing having an internal face,
a fan housed in the fan casing, said fan having an external diameter greater than or equal to 80 inches and comprising a disc provided with fan blades at its periphery, each fan blade comprising a blade tip extending at a length from the disc,
an abradable material fixed to the internal face of the fan casing, facing the fan blades,
a primary flow space configured to receive a core engine flow and a secondary flow space configured to receive a fan bypass flow, the primary flow space and the secondary flow space being concentric,
a turbine, housed in the primary flow space, the turbine being in fluid communication with the fan, and
a reduction mechanism, coupling the turbine and the fan, said reduction mechanism being configured to reduce a speed of rotation of the fan,
a distance between the blade tip of the fan blades and the internal face of the fan casing being less than or equal to six millimeters, said distance being measured when the engine is not operating, the abradable material being located within said distance, wherein a low-pressure shaft driven by the turbine and a fan shaft driving the fan are connected to the reduction mechanism, the fan shaft supported on a front bearing and on a rear bearing, and wherein an upstream end of the low-pressure shaft, the front bearing, the rear bearing, and the reduction mechanism are disposed upstream of an upstream end of a separating spout separating the primary flow space and the secondary flow space.

2. The bypass gas turbine engine according to claim 1, wherein the bypass gas turbine has a bypass ratio comprised between 12 and 18.

3. The bypass gas turbine engine according to claim 1, wherein the distance between the blade tip of the fan blades and the internal face of the fan casing is less than six millimeters.

4. The bypass gas turbine engine according to claim 1, wherein a thickness of the fan casing is less than or equal to fifteen millimeters.

5. The bypass gas turbine engine according to claim 1, wherein the external diameter of the fan is between eighty inches and one hundred inches.

6. The bypass gas turbine engine according to claim 1, wherein a difference in thickness of the fan casing along the fan casing, between an upstream end and a downstream end of said fan casing, is less than or equal to ten millimeters.

7. The bypass gas turbine engine according to claim 1, wherein the fan casing is made of a composite material comprising a fibrous reinforcement densified by a matrix, said fibrous reinforcement comprising fibres comprising at least one of the following materials: carbon, glass, aramid, silica carbide.

8. The bypass gas turbine engine according to claim 7, wherein a thickness of the fan casing is between eight millimeters and twenty millimeters.

9. The bypass gas turbine engine according to claim 1, wherein the reduction mechanism is a star gear mechanism or a planetary gear mechanism and has a reduction ratio between 2.5 and 5.

10. The bypass gas turbine engine according to claim 1, wherein said gas turbine engine has no decoupler between the fan and said separating spout.

11. The bypass gas turbine engine according to claim 1, wherein the distance between the blade tip of the fan blades and the internal face of the fan casing is between five millimeters and six millimeters.

12. The bypass gas turbine engine according to claim 7, wherein a thickness of the fan casing is less than or equal to twelve millimeters.

13. The bypass gas turbine engine according to claim 7, wherein a thickness of the fan casing in a zone extending opposite the fan blades is less than ten millimeters.

14. The bypass gas turbine engine according to claim 1, wherein the external diameter of the fan is between eighty inches and ninety inches.

15. The bypass gas turbine engine according to claim 7, wherein a thickness of the fan casing is between ten millimeters and eighteen millimeters.

16. The bypass gas turbine engine according to claim 7, wherein a thickness of the fan casing is between twelve millimeters and fifteen millimeters.

17. The bypass gas turbine engine according to claim 1, wherein the fan casing is made of a composite material comprising a fibrous reinforcement densified by a matrix, said matrix reinforcement comprising at least one polymer selected in the following group: epoxide, bismaleimide, polyimide.

18. A bypass gas turbine engine comprising:
a fan housed in a fan casing, said fan having an external diameter greater than or equal to 80 inches and comprising a disc provided with fan blades at its periphery, each fan blade comprising a blade tip extending at a first distance from the disc,
a primary flow space configured to receive a core engine flow and a secondary flow space configured to receive a fan bypass flow, the primary flow space and the secondary flow space being concentric,
a turbine, housed in the primary flow space, the turbine being in fluid communication with the fan, and
a reduction mechanism, coupling the turbine and the fan, said reduction mechanism being configured to reduce a speed of rotation of the fan,
a second distance between the blade tip of the fan blades and an internal face of the fan casing being less than or equal to six millimeters, said second distance being measured when the engine is not operating, an abradable material fixed to the internal face of the fan casing facing the fan blades being located within said second distance,
wherein a difference in thickness of the fan casing along the fan casing, between an upstream end and a downstream end of said fan casing, is less than ten millimeters,
wherein said difference in thickness accounts for all areas intermediate the upstream end and the downstream end of said fan casing,
wherein a low-pressure shaft driven by the turbine and a fan shaft driving the fan are connected to the reduction mechanism, the fan shaft supported on a front bearing and on a rear bearing, and
wherein an upstream end of the low-pressure shaft, the front bearing, the rear bearing, and the reduction mechanism are disposed upstream of an upstream end of a separating spout separating the primary flow space and the secondary flow space.

* * * * *